United States Patent [19]

Krueger et al.

[11] 4,420,555
[45] Dec. 13, 1983

[54] PHOTOGRAPHIC MATERIALS CONTAINING YELLOW FILTER DYES

[75] Inventors: Spencer M. Krueger, Beaverton, Oreg.; James W. Brown, III, Spencerport, N.Y.

[73] Assignee: Eastman Kodak Company, Rochester, N.Y.

[21] Appl. No.: 399,405

[22] Filed: Jul. 19, 1982

[51] Int. Cl.$^3$ ............................................. G03C 1/00
[52] U.S. Cl. ................................... 430/507; 430/517
[58] Field of Search ............................. 430/507, 517

[56] References Cited

U.S. PATENT DOCUMENTS

| | | | |
|---|---|---|---|
| 2,538,008 | 1/1951 | Keyes et al. | 260/465 |
| 2,538,009 | 1/1951 | Keyes et al. | 95/8 |

FOREIGN PATENT DOCUMENTS

| | | | |
|---|---|---|---|
| 695873 | 8/1953 | United Kingdom | 96/84 |
| 760739 | 11/1956 | United Kingdom | 96/84 |

OTHER PUBLICATIONS

Research Disclosure, Jul. 1977, Item No. 15930.

*Primary Examiner*—Jack P. Brammer
*Attorney, Agent, or Firm*—Richard E. Knapp

[57] ABSTRACT

Light sensitive layers in photographic elements are protected against exposure to radiation in the blue region of the visible spectrum by a yellow filter dye having the structure:

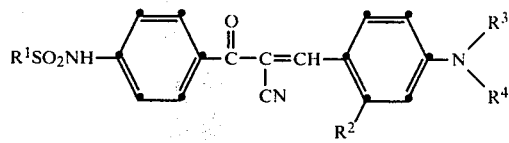

where:
$R^1$ is alkyl of 1 to 3 carbon atoms;
$R^2$ is hydrogen or alkyl of 1 to 3 carbon atoms;
$R^3$ and $R^4$ are each individually alkyl of 1 to 3 carbon atoms, at least one of which is terminated with

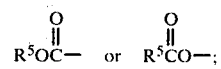

and
$R^5$ is alkyl of 1 to 3 carbon atoms or fluoroalkyl of 1 to 3 carbon atoms.

10 Claims, No Drawings

PHOTOGRAPHIC MATERIALS CONTAINING YELLOW FILTER DYES

This invention relates to color photographic materials in which one or more of the light sensitive layers is protected against exposure to light in the blue region of the spectrum by a layer of a yellow filter dye.

Common color photographic materials contain layer units sensitive to each of the primary regions of the visible spectrum, i.e. the blue, green and red regions. Silver halide employed in these materials has inherent sensitivity in the blue region of the visible spectrum and is rendered sensitive to the red or green regions of the spectrum by associating a spectral sensitizing dye therewith. Thus, the red- and green-sensitive layer units of color photographic materials are, by virtue of the native sensitivity of the silver halide, sensitive to radiation in the blue region of the spectrum as well as to radiation in the region of the spectrum intended to be recorded, i.e. red or green radiation. If blue light were to reach these layers in amounts sufficient to render silver halide grains therein developable, there would be a false rendition of the color information in the image being recorded. Therefore, it is common practice to interpose between the source of exposing radiation and the silver halide emulsion layer units intended to record red and green radiation, a layer which filters blue light. Such a layer is commonly placed between the blue-sensitive emulsion layer unit and all of the green- and/or red-sensitive emulsion layer units, although for particular applications it can be in other locations, e.g., further from the source of exposing radiation than some of the green- and/or red-sensitive layers or closer to the source of exposing radiation than some of the blue-sensitive layers.

While from the above discussion, it will be appreciated that the red- and green-sensitive layers are also sensitive to radiation in the blue region of the spectrum, the term blue-sensitive is commonly used in the art, and is used herein, to refer to that layer or layers of a photographic element which is intended to record blue light.

While the yellow filter layer serves a useful function during formation of the image, if it were allowed to remain in the final element, it would give the resultant image an overall yellowish cast. Therefore, it is common practice to remove the yellow filter layer during processing of the photographic material.

The most common material used in yellow filter layer is yellow colloidal silver, referred to in the art as Carey Lea silver. It absorbs blue light during exposure and is readily removed from the element during processing usually during the silver bleaching and fixing steps. However, since Carey Lea silver employs an expensive component, silver, and since it has some absorption in the green region of the spectrum, there have been efforts over the years to replace it with a yellow dye. U.S. Pat. Nos. 2,538,008 and 2,538,009 and U.K. Pat. Nos. 695,873 and 760,739 suggest dyes as replacements for Carey Lea silver.

While many dyes have the desired absorption characteristics, they have found little if any acceptance for use in yellow filter layers since they remain in the element after processing to such an extent that they cause background stain.

Thus, it would be desirable to have a yellow dye and a yellow filter layer formed therefrom which not only has the requisite spectral absorption characteristics but which also is readily bleached during common photographic processing steps.

The present invention provides such dyes and photographic elements containing such yellow filter layers.

In one aspect this invention relates to novel yellow dyes.

In another aspect this invention relates to novel photographic elements in which these dyes are incorporated in yellow filter layers.

Photographic elements in accordance with this invention comprise a support a silver halide emulsion layer sensitive to a region of the visible spectrum in addition to the blue region and a yellow filter layer between the silver halide emulsion layer and the intended source of exposure, the yellow filter layer comprising a dye represented by the structural formula:

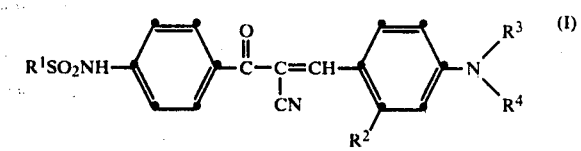

where:

$R^1$ is alkyl of 1 to 3 carbon atoms;
$R^2$ is hydrogen or alkyl of 1 to 3 carbon atoms;
$R^3$ and $R^4$ are each individually alkyl of 1 to 3 carbon atoms, at least one of which is terminated with

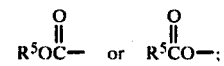

and $R^5$ is alkyl of 1 to 3 carbon atoms or fluoroalkyl of 1 to 3 carbon atoms.

Preferred are dyes wherein:

$R^1$ and $R^2$ are each individually alkyl of 1 to 3 carbon atoms;
$R^3$ and $R^4$ are each individually alkyl of 1 to 3 carbon atoms at least one of which is terminated with

and $R^5$ is alkyl or fluoroalkyl of 1 to 3 carbon atoms.

In the above structural formula suitable alkyl groups include methyl, ethyl, propyl and isopropyl. Suitable fluoroalkyl groups include methyl, ethyl, propyl and isopropyl in which one or more of the hydrogen atoms is replaced with a fluorine atom.

Representative dyes useful in this invention together with their wavelength of maximum spectral absorption ($\lambda_{max}$) are shown below in Table I with reference to structural formula I.

TABLE I

| Dye No | $R^1$ | $R^2$ | $R^3$ | $R^4$ | $\lambda_{max}$ (nm) |
|---|---|---|---|---|---|
| 1 | CH$_3$— | CH$_3$— | (CH$_3$)$_2$CHOCCH$_2$— (O) | (CH$_3$)$_2$CHOCCH$_2$— (O) | 453 |

TABLE I-continued

| Dye No | $R^1$ | $R^2$ | $R^3$ | $R^4$ | λmax (nm) |
|---|---|---|---|---|---|
| 2 | $C_2H_5-$ | $CH_3-$ | $(CH_3)_2CHO\overset{O}{\overset{\|}{C}}CH_2-$ | $(CH_3)_2CHO\overset{O}{\overset{\|}{C}}CH_2-$ | 454 |
| 3 | $C_2H_5-$ | $CH_3-$ | $C_2H_5-$ | $CF_3CH_2O\overset{O}{\overset{\|}{C}}CH_2CH_2-$ | 430 |
| 4 | $CH_3-$ | H | $(CH_3)_2CH\overset{O}{\overset{\|}{C}}OCH_2CH_2-$ | $(CH_3)_2CH\overset{O}{\overset{\|}{C}}OCH_2CH_2-$ | 430 |
| 5 | $C_2H_5-$ | H | $CH_3CH_2O\overset{O}{\overset{\|}{C}}CH_2-$ | $CH_3CH_2O\overset{O}{\overset{\|}{C}}CH_2-$ | 431 |
| 6 | $C_2H_5-$ | H | $(CH_3)_2CH\overset{O}{\overset{\|}{C}}OCH_2CH_2-$ | $(CH_3)_2CH\overset{O}{\overset{\|}{C}}OCH_2CH_2-$ | 438 |
| 7 | $C_2H_5-$ | H | $C_2H_5-$ | $CH_3CH_2O\overset{O}{\overset{\|}{C}}CH_2CH(CH_3)-$ | 437 |
| 8 | $C_3H_7-$ | $CH_3-$ | $C_2H_5-$ | $CF_3CH_2O\overset{O}{\overset{\|}{C}}CH_2-$ | 437 |
| 9 | $CH_3-$ | H | $(CH_3)_3C\overset{O}{\overset{\|}{C}}OCH_2CH_2-$ | $(CH_3)_3C\overset{O}{\overset{\|}{C}}OCH_2CH_2-$ | 450 |
| 10 | $C_3H_7-$ | $CH_3-$ | $C_2H_5-$ | $(CH_3)_2CHO\overset{O}{\overset{\|}{C}}CH_2CH_2-$ | 449 |

Dyes of this invention are conveniently prepared by one of two procedures which are schematically illustrated below. In accordance with the first procedure, a 4-aminobenzoylacetonitrile (1) is reacted with a dialkylaminobenzaldehyde (2) to yield the unsulfonated dye (3). This reaction can be carried out on a steam bath in the presence of a basic solvent, such as dry pyridine or in a non-basic solvent, such as ethanol with a basic additive, such as triethylamine. The dye is then sulfonated by reaction with the appropriate alkanesulfonylchloride (4) at room temperature in dry pyridine or a similar basic solvent. This reaction is carried out at room temperature, although in the early stages of the reaction an ice bath may be used.

In accordance with the second procedure, the 4-alkanesulfonaminobenzoylacetonitrile is first prepared by reaction of an alkanesulfonylchloride with 4-aminobenzoylacetonitrile at room temperature in dry pyridine. This product is in turn reacted with a dialkylaminobenzaldehyde at reflux temperature in isopropyl alcohol, acetonitrile, nitromethane, or a similar polar solvent and in the presence of a catalytic amount of piperidine, or another catalyst of comparable basicity such as tetramethylguanidine or triethylenediamine, to yield the desired dye.

These reactions are illustrated in Preparative Examples 1 and 2 infra.

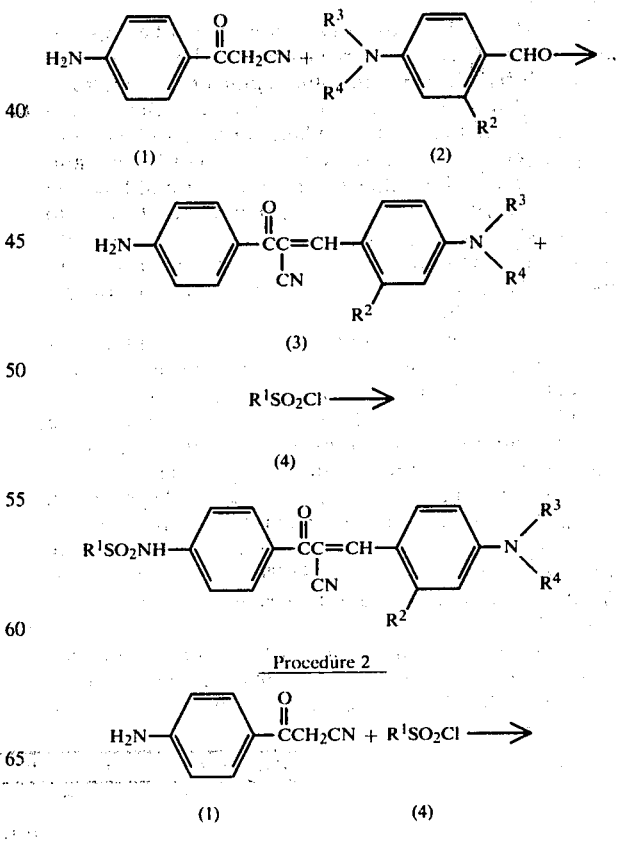

Procedure 1

Procedure 2

-continued

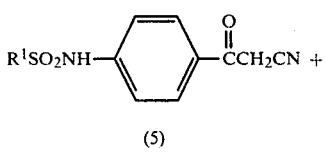

(5)

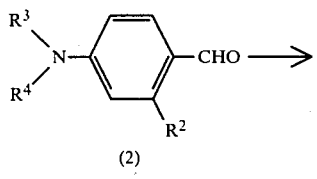

(2)

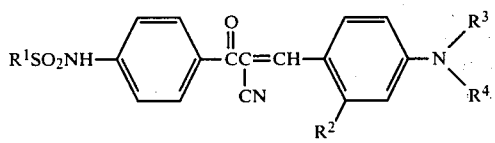

The yellow filter layer can incorporate a dye of this invention dispersed in a film forming, polymeric binder such as the binders employed in the silver halide emulsion layers as well as other naturally occurring or synthetic organic polymers. Useful binders include gelatin and gelatin derivatives, synthetic organic polymers such as polyvinyl alcohols and their derivatives, acrylamide polymers, polyvinylacetals, polyacrylates, and the like. An extensive listing of suitable binders is contained in *Research Disclosure*, December 1978, Item 17643, Paragraph IX. *Research Disclosure* is published by Industrial Opportunities Ltd., Homewell, Havant, Hampshire, P09 1EF, United Kingdom.

In a particularly preferred embodiment the filter layer of the present invention can comprise a yellow filter dye of this invention dispersed in a polymeric latex. The dye can be introduced into the latex during its formation or subsequent thereto. A useful technique for introducing the dye into the latex during its formations is described in Millikan U.S. Pat. No. 3,418,127 and comprises combining the dye with the monomeric components of the polymer and then polymerizing the monomers by conventional emulsion polymerization techniques. A useful technique for introducing the dye into the latex subsequent to its formation is described in *Research Disclosure*, July 1977, Item 15930, and comprises the steps of dissolving the dye in a water-miscible organic solvent, combining the solution thus formed with an aqueous latex of the polymer and optionally removing at least a portion of the water-miscible solvent. Other techniques are described in Chen U.S. Pat. Nos. 4,203,716 and 4,214,047 and in *Research Disclosure*, July 1980, Item 19551.

Preferred polymeric latexes comprise aqueous dispersions of polymers comprised of repeating units in the proportions indicated:

(a) Repeating units forming from 40 to 98 percent by weight of the polymer derived from one or more of the following monomers:
  (i) ethenic monomers such as isoprene, chloroprene, 1,3-butadiene, propenenitrile, vinylidene chloride, vinyl chloride, vinyl fluoride, vinylidene fluoride, ethylene, propylene and the like.
  (ii) monomers such as styrene, o-vinyltoluene, p-vinyltoluene, p-chloromethylstyrene, m-chloromethylstyrene, α-methylstyrene, 2-ethyl styrene, 4-butylstyrene, 4-pentyl styrene, 2-vinylmesitylene and 1-vinylnaphthalene.
  (iii) esters of 2-alkenoic acids such as esters of acrylic acid, methacrylic acid, α-ethylacrylic acid, α-propylacrylic acid, α-butylacrylic acid, α-pentylacrylic acid, 2-butenoic acid, 2-methyl-2-octenoic acid and similar acids.
  (iv) vinyl acetate (b) Repeating units forming 2 to 25 percent by weight of the polymer derived from hydrophilic ethenic monomers having a molecular weight of at most about 300 capable of forming a water soluble homopolymer such as:

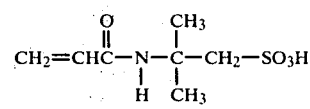

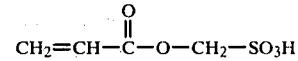

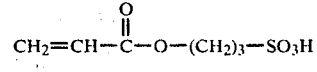

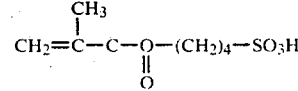

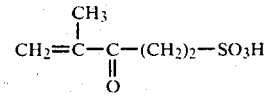

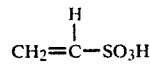

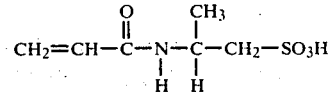

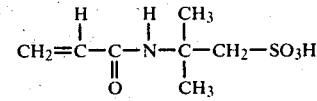

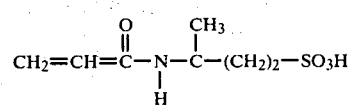

p-styrene sulfonic acid
acrylic acid
methacrylic acid and
alkali metal salts of such monomers.

(c) Repeating units forming from 0 to 30 percent by weight of the polymers derived from acrylamide monomers such as acrylamide, N-methylacrylamide, N,N-dimethylacrylamide, N-isopropylacrylamide, N-butylacrylamide, N-chloromethylacrylamide, N-bromomethylacrylamide.

(d) Repeating units forming 0 to 58 percent by weight of the polymer derived from hardenable (i.e., crosslinkable after polymerization) ethenic monomers having a molecular weight of at most about 300 such as:
N-allylcyanoacetamide,
Ethyl methacryloylacetoacetate,
N-cyanoacetyl-N'-methacryloylhydrazine, 2-acetoacetoxyethyl methacrylate,
N-(3-methacryloyloxypropyl)cyanoacetamide,
2-cyanoacetoxyethyl methacrylate,
N-(2-methacryloyloxyethyl)cyanoacetamide,
Ethyl α-acetoacetoxymethylacrylate,
2-acetoacetoxypropyl methacrylate,
3-acetoacetoxy-2,2-dimethylpropyl methacrylate,
N-(methacryloyloxymethyl)acetoacetamide,
N-t-butyl-N-(methacryloyloxyethyl)acetoacetamide,
2-acetoacetoxyethyl acrylate and
2-acetoacetoxy-2-methylpropyl methacrylate.

(e) Repeating units forming from 0 to 5 percent by weight of the polymer derived from crosslinking monomers such as divinylbenzene, allyl acrylate, allyl methacrylate, N-allylmethacrylamide, 4,4'-isopropylidenediphenyl diacrylate, 1,3-butylene diacrylate, 1,3-butylene dimethacrylate, 1,4-cyclohexylenedimethylene dimethacrylate, ethylene glycol dimethacrylate, diisopropylene glycol dimethacrylate, divinyloxymethane, ethylene diacrylate, ethylidene diacrylate, propylidene dimethacrylate, 1,6-diacrylamidohexane, 1,6-hexamethylene diacrylate, 1,6-hexamethylene dimethacrylate, N,N'-methylene bisacrylamide, neopentyl glycol dimethacrylate, phenylethylene dimethacrylate, tetraethylene glycol dimethacrylate, tetramethylene diacrylate, tetramethylene dimethacrylate, 2,2,2-trichloroethylidene dimethacrylate, triethylene glycol diacrylate, triethylene glycol dimethacrylate, ethylidyne trimethacrylate, propylidyne triacrylate, vinyl allyloxyacetate, vinyl methacrylate, 1-vinyloxy-2-allyloxyethane, and the like.

Illustrative polymers are:
Poly(sec-Butyl acrylate-co-2-Acryloyloxypropane-1-sulfonic acid, sodium salt-co-2-Acetoacetoxyethyl methacrylate) (85/10/5),
Poly(Ethyl acrylate-co-3-Acryloyloxypropane-1-sulfonic acid, sodium salt-co-2-Acetoacetoxyethyl methacrylate) (85/10/5),
Poly(Methyl acrylate-co-tetrahydrofurfuryl methacrylate-co-2-acrylamido-2-methylpropane sulfonic acid sodium salt) (30/65/5)
Poly(Methyl acrylate-co-2-acrylamido-2-methylpropane sulfonic acid-co-2-acetoacetoxyethyl methacrylate) (89.6/7.6/2.8),
Poly(Methyl acrylate-co-3-Acryloyloxypropane-1-sulfonic acid, sodium salt-co-2-Acetoacetoxyethyl methacrylate) (85/10/5),
Poly(n-Butyl acrylate-co-3-Acryloyloxypropane-1-sulfonic acid, sodium salt-co-2-Acetoacetoxyethyl methacrylate) (85/10/5),
Poly(Isobutyl acrylate-co-3-Acryloyloxypropane-1-sulfonic acid, sodium salt-co-2-Acetoacetoxyethyl methacrylate) (85/10/5)
Poly(Vinyl acetate-co-3-Acryloyloxypropane-1-sulfonic acid, sodium salt-co-2-Acetoacetoxyethyl methacrylate) (85/10/5),
Poly(n-Butyl methacrylate-co-3-Methacryloyloxypropane-1-sulfonic acid, sodium salt) (90/10),
Poly(n-Butyl acrylate-co-3-Methacryloyloxypropane-1-sulfonic acid, sodium salt) (85/15),
Poly(n-Butyl acrylate-co-3-Methacryloyloxypropane-1-sulfonic acid, sodium salt) (80/20),
Poly(Methyl acrylate-co-3-Methacryloyloxypropane-1-sulfonic acid, sodium salt) (80/20),
Poly(n-Butyl acrylate-co-3-Methacryloyloxypropane-1-sulfonic acid, sodium salt-co-2-Acetoacetoxyethyl methacrylate) (85/10/5),
Poly(n-Butyl acrylate-co-3-Methacryloyloxypropane-1-sulfonic acid, sodium salt-co-2-Acetoacetoxyethyl methacrylate) (80/15/5),
Poly(Ethyl acrylate-co-3-Methacryloyloxypropane-1-sulfonic acid, sodium salt-co-2-Acetoacetoxyethyl methacrylate (85/10/5),
Poly(Isobutyl acrylate-co-3-Methacryloyloxypropane-1-sulfonic acid, sodium salt-co-2-Acetoacetoxyethyl methacrylate (85/10/5),
Poly(sec-Butyl acrylate-co-3-Methacryloyloxypropane-1-sulfonic acid, sodium salt-co-2-Acetoacetoxyethyl methacrylate) (85/10/5),
Poly(n-Butyl methacrylate-co-3-Methacryloyloxypropane-1-sulfonic acid, sodium salt-co-2-Acetoacetoxyethyl methacrylate) (85/10/5),
Poly(n-Butyl methacrylate-co-3-Methacryloyloxypropane-1-sulfonic acid, sodium salt-co-Acrylic acid) (80/10/10),
Poly(n-Butyl methacrylate-co-3-Methacryloyloxypropane-1-sulfonic acid, sodium salt-co-2-Acetoacetoxyethyl methacrylate) (90/5/5),
Poly(Methyl methacrylate-co-3-Methacryloyloxypropane-1-sulfonic acid, sodium salt-co-2-Acetoacetoxyethyl methacrylate) (85/10/5),
Poly(n-Butyl acrylate-co-Methyl methacrylate-co-3-Methacryloyloxypropane-1-sulfonic acid, sodium salt-co-2-Acetoacetoxyethyl methacrylate) (55/30/10/5),
Poly(n-Butyl methacrylate-co-Methyl methacrylate-co-3-Methacryloyloxypropane-1-sulfonic acid, sodium salt-co-2-Acetoacetoxyethyl methacrylate) (70/15/10/5),
Poly(n-Butyl acrylate-co-2-Ethylhexyl acrylate-co-3-Methacryloyloxypropane-1-sulfonic acid, sodium salt-co-2-Acetoacetoxyethyl methacrylate) (60/25/10/5),
Poly(n-Butyl acrylate-co-n-Butyl methacrylate-co-3-Methacryloyloxypropane-1-sulfonic acid, sodium salt-co-2-Acetoacetoxyethyl methacrylate) (40/45/10/5),
Poly(Methyl acrylate-co-3-Methacryloyloxypropane-1-sulfonic acid, sodium salt-co-2-Acetoacetoxyethyl methacrylate) (85/10/5),
Poly(n-Butyl acrylate-co-3-Methacryloyloxypropane-1-sulfonic acid, sodium salt-co-2-Acrylamido-2-methylpropane sulfonic acid) (70/20/10),
Poly(n-Butyl acrylate-co-2-Acrylamido-2-methylpropane sulfonic acid) (97.5/2.5),
Poly(n-Butyl acrylate-co-2-Acrylamido-2-methylpropane sulfonic acid) (95/5),
Poly(n-Butyl acrylate-co-2-Acrylamido-2-methylpropane sulfonic acid) (90/10),
Poly(n-Butyl acrylate-co-2-Acrylamido-2-methylpropane sulfonic acid) (85/15),
Poly(n-Butyl acrylate-co-2-Acrylamido-2-methylpropane sulfonic acid) (80/20),
Poly(n-Butyl methacrylate-co-2-Acrylamido-2-methylpropane sulfonic acid) (90/10),
Poly(Styrene-co-2-Acrylamido-2-methylpropane sulfonic acid) (90/10),
Poly(Vinyl acetate-co-2-Acrylamido-2-methylpropane sulfonic acid) (90/10),
Poly(n-Butyl methacrylate-co-2-Acrylamido-2-methylpropane sulfonic acid-co-Acrylic acid) (80/10/10),
Poly(n-Butyl methacrylate-co-2-Acrylamido-2-methylpropane sulfonic acid-co-Divinyl benzene) (88/10/2),
Poly(n-Butyl acrylate-co-Styrene-co-2-Acrylamido-2-methylpropane sulfonic acid) (30/65/5), Poly(n-Butyl acrylate-co-Vinylidene chloride-co-2-Acrylamido-2-methylpropane sulfonic acid) (50/45/5), Poly(Styrene-co-Methyl methacrylate-co-2-Acrylamido-2-methylpropane sulfonic acid) (45/45/10), Poly(n-Butyl methacrylate-co-2-Acrylamido-2-methylpropane sulfonic acid-co-2-Acetoacetoxyethyl methacrylate) (85/10/5), Poly(n-Butyl methacrylate-co-Styrene-co-2-Acrylamido-2-methylpropane sulfonic acid) (50/40/10), Poly(Ethyl acrylate-co-2-Acrylamido-2-methylpropane sulfonic acid-co-2-Acetoacetoxyethyl methacrylate) (85/10/5), Poly(2-Ethylhexyl acrylate-co-2-Acrylamido-2-methylpropane sulfonic acid-co-2-Acetoacetoxyethyl methacrylate (85/10/5), Poly(n-Butyl acrylate-co-N-Isopropylacrylamide-co-2-Acrylamido-2-methylpropane sulfonic acid) (80/10/10), Poly(n-Butyl methacrylate-co-2-Acrylamido-2-methylpropane sulfonic acid-co-2-Acetoacetoxyethyl methacrylate-co-Divinyl benzene) (85/10/4/1), Poly(n-Butyl methacrylate-co-Methyl methacrylate-co-2-Acrylamido-2-methylpropane sulfonic acid-co-2-Acetoacetoxyethyl methacrylate) (75/10/10/5), Poly(n-Butyl acrylate-co-n-Butyl methacrylate-co-Styrene-co-2-Acrylamido-2-methylpropane sulfonic acid) (10/10/70/10), Poly(n-Butyl acrylate-co-Methyl acrylate-co-2-Acrylamido-2-methylpropane sulfonic acid-co-2-Acetoacetoxyethyl methacrylate) (45/40/10/5), Poly(n-Butyl acrylate-co-Methyl methacrylate-co-2-Acrylamido-2-methylpropane sulfonic acid-co-2-Acetoacetoxyethyl methacrylate) (75/10/10/5), Poly(n-Butyl acrylate-co-Acrylamido-co-Styrene-co-2-Acrylamido-2-methylpropane sulfonic acid) (20/30/45/5), Poly(n-Butyl acrylate-co-2-Acrylamido-2-methylpropane sulfonic acid-co-2-Acetoacetoxyethyl methacrylate) (85/10/5), Poly(n-Butyl acrylate-co-2-Acetoacetoxyethyl methacrylate-co-2-Acrylamido-2-methylpropane sulfonic acid) (40/50/10), Poly(2-Acetoacetoxyethyl methacrylate-co-n-Butyl acrylate-co-2-Acrylamido-2-methylpropane sulfonic acid) (60/30/10), Poly(n-Butyl acrylate-co-2-Acetoacetoxyethyl methacrylate-co-2-Acrylamido-2-methylpropane sulfonic acid) (50/40/10), Poly(Ethyl acrylate-co-2-Acrylamido-2-methylpropane sulfonic acid-co-2-Acetoacetoxyethyl methacrylate) (85/10/5), Poly(Methyl acrylate-co-2-Acrylamido-2-methylpropane sulfonic acid-co-2-Acetoacetoxyethyl methacrylate) (85/10/5), Poly(sec-Butyl acrylate-co-3-Methacryloyloxy propane-1-methyl-1-sulfonic acid, sodium salt-co-2-Acetoacetoxyethyl methacrylate) (85/10/5), Poly(n-Butyl methacrylate-co-3-Methacryloyloxypropane-1-methyl-1-sulfonic acid, sodium salt-co-2-Acetoacetoxyethyl methacrylate) (85/10/5), Poly(n-Butyl methacrylate-co-3-Methacryloyloxypropane-1-methyl-1-sulfonic acid, sodium salt-co-Methyl methacrylate-co-2-Acetoacetoxyethyl methacrylate) (70/15/10/5).

Poly(n-Butyl acrylate-co-3-Methacryloyloxypropane-1-methyl-1-sulfonic acid, sodium salt-co-2-Acetoacetoxyethyl methacrylate) (85/10/5), Poly(n-Butyl acrylate-co-p-Styrene sulfonic acid, potassium salt) (95/5), Poly(n-Butyl acrylate-co-2-Acrylamido-2-methylpropane sulfonic acid-co-2-Hydroxyethyl methacrylate) (75/20/5), Poly(n-Butyl methacrylate-co-p-Styrene sulfonic acid, potassium salt (95/5), and Poly(Methylacrylate-co-2-acrylamido-2-methyl propane sulfonic acid) (95/5).

The ratios shown in parenthesis are weight ratios of the repeating units corresponding to their order of recitation.

In a preferred embodiment the photographic elements of this invention contain the yellow filter layer positioned between two light sensitive silver halide emulsion layers. At least one of the layers is sensitive to the blue region of the spectrum and the other is sensitive to at least one region other than the blue. Typically, the photographic element will be a multilayer multicolor element containing layers sensitive to each of the blue, green and red regions of the visible spectrum. In such materials, it is preferred that the yellow filter layer be between all of the blue-sensitive layers and all of the green and red-sensitive layers although it is possible for particular applications to have some of the red and/or green layers closer to the blue sensitive than the yellow filter layer. One such alternative arrangement is described in U.S. Pat. No. 4,129,446 where a yellow filter layer is positioned between pairs of green- and red-sensitive emulsion layers so that at least some blue radiation reaches the faster green- and red-sensitive layers before striking the yellow filter layer. Other alternative arrangements are shown in U.S. Pat. Nos. 3,658,536; 3,990,898; 4,157,917 and 4,165,236.

In the filter layer the ratio of vehicle to dye is typically in the range of 10:1 to 1:1 parts by weight and the filter layer will contain about 0.10 to 0.25 gram of dye per square meter. However, these ratios and amounts can be varied outside of these ranges depending upon such factors as the particular components employed, their compatibility with one another and the amount of blue radiation desired to be absorbed by the filter layer.

The silver halide emulsion layers employed in the photographic elements of this invention comprise light sensitive silver halide emulsions well known in the art. They can be negative-working emulsions or direct positive emulsions. At least the green-sensitive and red-sensitive emulsion layers are sensitized to those regions of the spectrum respectively with spectral sensitizing dyes. Details regarding suitable silver halide emulsions, their preparation, and chemical and spectral sensitization are described in *Research Disclosure,* December 1978, Item 17643, Sections I, II, III, IV and IX. Preferred silver halides are silver bromides and silver bromoiodides. The emulsions commonly contain additional addenda such as antifoggants and stabilizers, couplers or other dye forming materials, hardeners, coating aids, plasticizers and lubricants, and matting agents, all of which are described in the above referenced *Research Disclosure* item.

The support can be any common photographic support such as polymeric film, paper and polymer coated paper as described in the above referenced *Research Disclosure* item paragraph.

In accordance with this invention, the exposed photographic elements can be processed to yield a dye image and contemporaneous with processing the yellow filter layer is bleached and discharged to an extent that it does not interfere with the true color rendition of the image. Typically, following processing, the yellow filter layer contributes less than 0.2 density unit, and in preferred embodiments, less than 0.1 density unit to the minimum density areas of the element. Processing can be the common processing employed to develop color photographic elements. A negative image can be developed by color development with a chromogenic developing agent followed by bleaching and fixing. Alternatively, a positive image can be developed by first developing with a nonchromogenic developer then uniformly fogging the element and developing it with a chromogenic developer. If the material does not contain a color coupler dye images can be produced by incorporating a coupler in the color developer solutions.

Bleaching and fixing can be performed with the common materials employed for that purpose. Bleach baths commonly comprise an aqueous solution of an oxidizing agent such as water soluble salts and complexes of iron-(III), e.g., potassium ferricyanide, ferric chloride, ammonium or potassium salts of ferric ethylenediaminetetraacetic acid; water soluble persulfate, e.g., potassium, sodium or ammonium persulfate; water soluble dichromates, e.g., potassium, sodium and lithium dichromate; and the like.

Fixing baths commonly comprise an aqueous solution of compounds which form soluble salts with silver ion, such as sodium thiosulfate, ammonium thiosulfate, potassium thiocyanate, sodium thiocyanate, thiourea and the like. Preferred bleaches for use with the present elements are ferricyanide bleaches and sulfite bleaches.

The following examples are included for a fuller understanding of this invention.

Preparative Example 1

Preparation of
[α-Cyano-4-[N-ethyl-N-(2,2,2-trifluoroethoxycarbonylmethyl)]amino-2-methyl-4'-propanesulfonamidochalcone]

Part A—Preparation of
N-Ethyl-N-(2,2,2-trifluoroethoxycarbonylmethyl)-m-toluidine

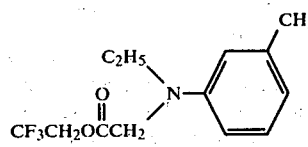

A mixture of 13.5 g (0.1 mole) N-ethyl-m-toluidine, 22.1 g (0.1 mole) trifluoroethyl bromoacetate and 7.0 g (0.051 mole) potassium carbonate in 100 ml of acetone was heated at reflux for two hours. Water (10 ml) was added and the mixture heated at reflux overnight. Solvent was removed on a rotary evaporator, ether added and the layers separated. The aqueous layer was extracted with ether. The combined ether solution was washed once with 50 ml of water and dried over sodium sulfate. Removal of ether gave 26.0 g brown oil which gave one spot by thin layer chromatography and was used as isolated (94%).

Part B—Preparation of
4-[N-Ethyl-N-(2,2,2-trifluoroethoxycarbonylmethyl)]-amino-2-methylbenzaldehyde:

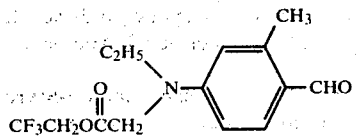

Phosphoryl chloride (7.7 g, 0.05 mole) was added dropwise to a flask containing dry dimethylformamide (16 ml) with stirring in an ice bath. The system was protected from moisture. The compound of Part A (13.75 g, 0.05 mole) was added to the resulting mixture at ice bath temperature, stirred at room temperature for 15 minutes and heated over a steam bath for two hours. The hot mixture was then added to 300 ml of a saturated sodium acetate solution and stirred until the product solidified. The product was collected, washed with water and recrystallized from methanol to yield 12.8 g (84%) product, mp 73°–74° C.

Part C—Preparation of
4'-Amino-α-cyano-4-[N-ethyl-N-(2,2,2-trifluoroethoxycarbonylmethyl]-amino-2-methylchalcone

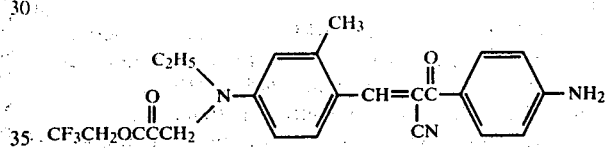

A mixture of 8.0 g (0.05 mole) 4-aminobenzoylacetonitrile and 15.5 g (0.05 mole) of the compound of Part B was heated over the steam bath for 35 minutes with 25 ml dry pyridine. The mixture was cooled, diluted with 100 ml of t-butyl alcohol and allowed to crystallize. The product was collected, washed with t-butyl alcohol, ether and dried to yield 14.8 g yellow solid (66%). The product was recrystallized from t-butyl alcohol, mp 140°–142° C.

Part D—Preparation of Dye 8

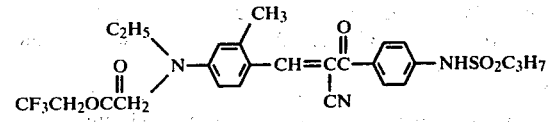

Cold pyridine (10 ml) was added to a mixture of 4.45 g (0.01 mole) of the compound of Part C and 2.0 g (0.014 mole) 1-propanesulfonyl chloride. The mixture was stirred in an ice bath for one hour and then for four hours at room temperature. The mixture was diluted with 35 ml t-butyl alcohol and 25 ml water, treated with a seed crystal and allowed to slowly crystallize. The product was collected, washed with a small quantity of t-butyl alcohol, ether and dried. Total yield was 4.0 g (73%) yellow solid, mp 133°–135° C. The dye can be recrystallized from toluene or t-butyl alcohol with a small quantity of acetonitrile to give pure material mp 144°–145° C.

Preparative Example 2

Preparation of α-cyano-4-[N-ethyl-N-(2-isopropoxycarbonylethyl)-]amino-2-methyl-4'-propanesulfonamidochalcone

Part A—Preparation of 4-(Propanesulfonamido)benzoylacetonitrile

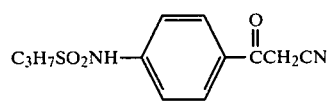

Dry pyridine (13 ml) was added dropwise to a stirred mixture of 14.3 g (0.1 mole) 1-propanesulfonyl chloride, 15 ml dry methyl acetate and 16.0 g (0.1 mole) 4-aminobenzoylacetonitrile at room temperature. An ice bath was then used to control the exothermic reaction and the mixture was stirred in the ice bath for two hours. Methanol (50 ml) was added and the resulting solution poured into 2 N hydrochloric acid (240 ml) with stirring. The solid was collected, washed with water and dried. Yield 20.7 g (78%). Recrystallization yielded product melting at 150°-151° C.

Part B—Preparation of N-Ethyl-N-(2-isopropoxycarbonylethyl)-m-toluidine

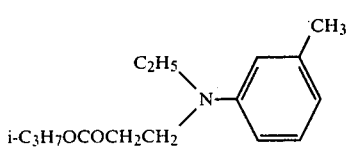

A mixture of 13.5 g (0.1 mole) N-ethyl-m-toluidine, 11.4 g (0.1 mole) isopropyl acrylate and 2 ml glacial acetic acid was heated over the steam bath for 16 hours. The mixture was cooled and diluted with ether. The ether solution was washed with 10 ml water, twice with 10 ml portions of 5% sodium carbonate solution, once with 10 ml of water and then dried over sodium sulfate. Removal of the ether with a rotary evaporator at 50° C. and reduced pressure gave 22.0 g (86%) of oil, which was pure by thin layer chromatography and was used as isolated.

Part C—Preparation of 4-[N-Ethyl-N-(2-isopropoxycarbonylethyl)]-amino-2-methylbenzaldehyde

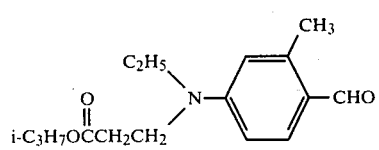

This compound was prepared from the compound of Part B by the Vilsmeier reaction using the procedure of Preparative Example 1, Part B to yield 21.3 g of dark oil, which was used as isolated.

Part D—Preparation of Dye 10

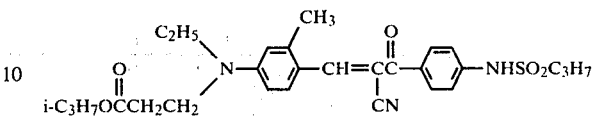

The 4-(propanesulfonamido)benzoylacetonitrile (5.4 g, 0.02 mole) and the benzaldehyde from Part C (5.6 g, 0.02 mole) were heated at reflux for two hours in 100 ml of isopropyl alcohol with 10 drops piperidine as a catalyst. The mixture was cooled, 5 ml acetonitrile added and the dye allowed to crystallize following addition of a seed crystal. The yellow solid was collected, washed with ether and dried to yield 6.8 g (64%). Recrytallization from isopropyl alcohol gave pure material. Yield 5.9 g, mp 132°-135° C.

EXAMPLE 1

Photographic elements were prepared having the following schematic structure:

| |
|---|
| Blue-Sensitive Silver Halide Emulsion Layer |
| Yellow Filter Layer |
| Green-Sensitive and Red-Sensitive Silver Halide Emulsion Layers |
| Support |

The yellow filter layer was composed of one of the dyes shown in Table II, below dispersed in a polymeric latex as identified in Table II at a ratio of dye to latex of 1 to 2 parts by weight and coated to provide 0.16 gram dye/square meter. In addition, an element was prepared from which the yellow filter layer was omitted. The elements were exposed through a neutral density step tablet and then processed as described in the *British Journal of Photography*, July 12, 1974, pp. 597-8. The density of each of the elements was measured with a densitometer and the minimum density of the element without the yellow filter layer was subtracted from the minimum density of each of the other elements to yield the value reported as $\Delta D_{min}$ in Table II, below. Thus, $\Delta D_{min}$ represents the background density attributed to residual yellow filter dye remaining in the element and is a measure of how effectively the dye is removed from the element or decolorized during processing. As will be observed from Table II, the dyes of this invention yield significantly less background density than do the comparison dyes.

TABLE II

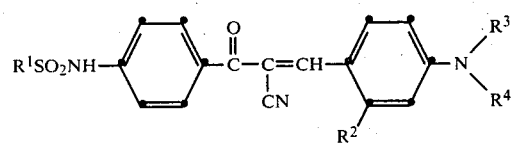

| Coating | Dye | Polymer | $R^1$ | $R^2$ | $R^3$ | $R^4$ | $\Delta D_{min}$ |
|---|---|---|---|---|---|---|---|
| 1 | A (comparison) | a | $C_6H_5-$ | H | $C_2H_5-$ | $C_2H_5-$ | +.22 |

TABLE II-continued $$R^1SO_2NH-\text{Ar}-\underset{O}{\overset{\|}{C}}-\underset{CN}{\overset{}{C}}=CH-\text{Ar}(R^2)-N(R^3)(R^4)$$

| Coating | Dye | Polymer | $R^1$ | $R^2$ | $R^3$ | $R^4$ | $\Delta D_{min}$ |
|---|---|---|---|---|---|---|---|
| 2 | B (comparison) | a | $C_6H_{13}-$ | H | $C_2H_5-$ | $C_2H_5-$ | +.64 |
| 3 | 1 | b | $CH_3-$ | $CH_3-$ | $(CH_3)_2CHOCOCH_2-$ | $(CH_3)_2CHOCOCH_2-$ | +.04 |
| 4 | 2 | a | $C_2H_5-$ | $CH_3-$ | $(CH_3)_2CHOCOCH_2-$ | $(CH_3)_2CHOCOCH_2-$ | +.04 |
| 5 | 2 | b | $C_2H_5-$ | $CH_3-$ | $(CH_3)_2CHOCOCH_2-$ | $(CH_3)_2CHOCOCH_2-$ | +.05 |
| 6 | 3 | b | $C_2H_5-$ | $CH_3-$ | $C_2H_5-$ | $CF_3CH_2OCOCH_2CH_2-$ | +.05 |
| 7 | 4 | a | $CH_3-$ | H | $(CH_3)_2CHCOOCH_2CH_2-$ | $(CH_3)_2CHCOOCH_2CH_2-$ | +.06 |
| 8 | 5 | b | $C_2H_5-$ | H | $CH_3CH_2OCOCH_2-$ | $(CH_3CH_2OCOCH_2-$ | +.06 |
| 9 | 6 | b | $C_2H_5-$ | H | $(CH_3)_2CHCOOCH_2CH_2-$ | $(CH_3)_2CHCOOCH_2CH_2-$ | +.14 |
| 10 | 7 | b | $C_2H_5-$ | H | $C_2H_5-$ | $CH_3CH_2OCOCH_2CH(CH_3)-$ | +.14 |
| 11 | 8 | b | $C_3H_7-$ | $CH_3-$ | $C_2H_5-$ | $CF_3CH_2OCOCH_2-$ | +.15 |
| 12[2] | 1 / 8 | a | $CH_3-$ / $C_3H_7-$ | $CH_3-$ / $CH_3-$ | $(CH_3)_2CHOCOCH_2-$ / $CF_3CH_2OCOCH_2-$ | $(CH_3)_2CHOCOCH_2-$ / $CF_3CH_2OCOCH_2-$ | +.06 |

[1] The polymer employed was poly(methylacrylate-co-tetrahydrofurfuryl methacrylate-co-2-acrylamido-2-methylpropane sulfonic acid, sodium salt. The weight ratio of the comonomers was 30/65/5, denoted by the Symbol (a), or was 55/40/5, denoted by the Symbol (b).
[2] The dyes were used in equal amounts.

This invention has been described in detail with particular reference to certain preferred embodiments thereof, but it will be understood that variations and modifications can be effected within the spirit and scope of the invention.

What is claimed is:

1. In a photographic element comprising a support, a silver halide emulsion layer sensitive to a region of the visible spectrum in addition to the blue region, and a yellow filter layer between the silver halide emulsion layer and the intended source of exposure, the improvement wherein the yellow filter layer comprises a yellow dye represented by the structural formula:

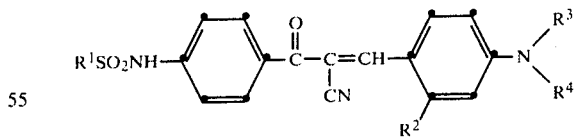

where:
$R^1$ is alkyl of 1 to 3 carbon atoms;
$R^2$ is hydrogen or alkyl of 1 to 3 carbon atoms;
$R^3$ and $R^4$ each individually alkyl of 1 to 3 carbon atoms, at least one of which is terminated with

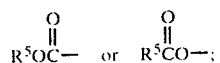

and $R^5$ is alkyl of 1 to 3 carbon atoms or fluoroalkyl of 1 to 3 carbon atoms.

2. A photographic element of claim 1 wherein:

$R^1$ and $R^2$ are each individually alkyl of 1 to 3 carbon atoms;

$R^3$ and $R^4$ are each individually alkyl of 1 to 3 carbon atoms, at least one of which is terminated with $$R^5O\overset{O}{\underset{\|}{C}}-;$$

and $R^5$ is alkyl or fluoroalkyl of 1 to 3 carbon atoms.

3. A photographic element of claim 1 or 2 wherein the yellow filter layer further comprises a polymeric latex.

4. A photographic element of claim 3 wherein the polymeric latex comprises a polymer having the following repeating units:
(a) 40 to 98 weight percent repeating units derived from one or more esters of a 2-alkenoic acid monomer;
(b) 2 to 25 weight percent repeating units derived from a hydrophilic ethenic monomer; and
(c) 0 to 58 weight percent repeating units derived from a hardenable monomer.

5. In a photographic element comprising a support bearing red-sensitive and green-sensitive silver halide emulsion layers, a yellow filter layer and a blue sensitive silver halide emulsion layer, the improvement wherein the yellow filter layer comprises a yellow dye represented by the structural formula:

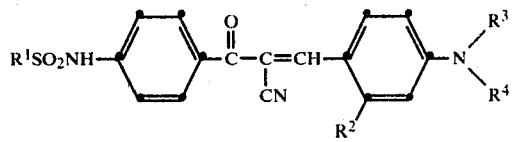

where:

$R^1$ is alkyl of 1 to 3 carbon atoms;

$R^2$ is hydrogen or alkyl of 1 to 3 carbon atoms;

$R^3$ and $R^4$ are each individually alkyl of 1 to 3 carbon atoms, at least one of which is terminated with

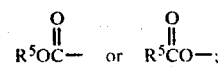

and $R^5$ is alkyl of 1 to 3 carbon atoms or fluoroalkyl of 1 to 3 carbon atoms.

6. A photographic element of claim 5 wherein:

$R^1$ and $R^2$ are each individually alkyl of 1 to 3 carbon atoms;

$R^3$ and $R^4$ are each individually alkyl of 1 to 3 carbon atoms, at least one of which is terminated with

and $R^5$ is alkyl or fluoroalkyl of 1 to 3 carbon atoms.

7. A photographic element of claim 5 wherein the yellow filter layer comprises one or more of the following dyes:

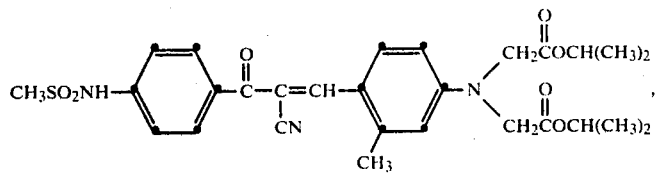

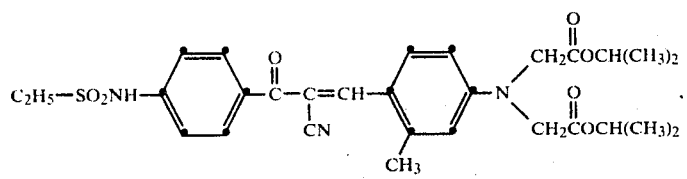

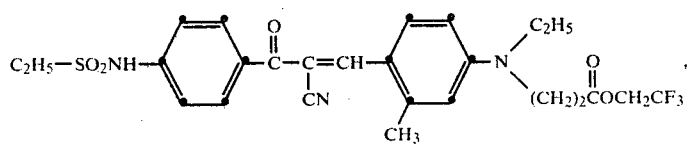

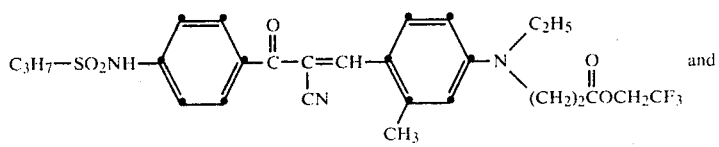

and

-continued

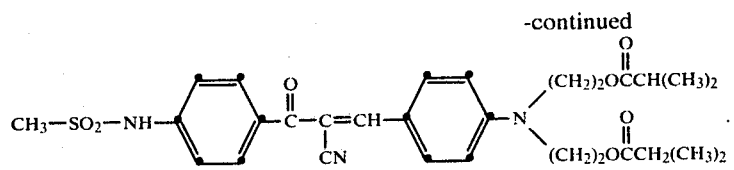

8. A photographic element of claim 5, 6 or 7 wherein the yellow filter layer further comprises a polymeric latex.

9. A photographic element of claim 8 wherein the polymeric latex comprises a polymer having the following repeating units:
(a) 40 to 98 weight percent repeating units derived from one or more esters of a 2-alkenoic acid monomer;
(b) 2 to 25 weight percent repeating units derived from a hydrophilic ethenic monomer; and
(c) 0 to 58 weight percent repeating units derived from a hardenable monomer.

10. A photographic element of claim 8 wherein the polymeric latex comprises a polymer selected from poly(methyl acrylate-co-tetrahydrofurfuryl methacrylate-co-2-acrylamido-2-methylpropane sulfonic acid), poly(methyl acrylate-co-2-acrylamido-2-methylpropane sulfonic acid-co-2-acetoacetoxyethyl methacrylate); poly(methylacrylate-co-2-acrylamido-2-methylpropane sulfonic acid) and alkali metal salts thereof.

* * * * *